US012451928B2

(12) United States Patent
Wu et al.

(10) Patent No.: US 12,451,928 B2
(45) Date of Patent: Oct. 21, 2025

(54) COMMUNICATION SYSTEM AND WEARABLE DEVICE AND COMMUNICATION METHOD THEREOF

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW);
Wei-Chih Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 305 days.

(21) Appl. No.: 18/462,770

(22) Filed: Sep. 7, 2023

(65) Prior Publication Data

US 2025/0023236 A1  Jan. 16, 2025

(30) Foreign Application Priority Data

Jul. 14, 2023  (TW) ................. 112126421

(51) Int. Cl.
| | |
|---|---|
| *H04B 5/43* | (2024.01) |
| *G06F 3/01* | (2006.01) |
| *H01Q 1/27* | (2006.01) |
| *H01Q 15/14* | (2006.01) |
| *H04B 5/26* | (2024.01) |

(52) U.S. Cl.
CPC .............. *H04B 5/43* (2024.01); *G06F 3/013* (2013.01); *H01Q 1/276* (2013.01); *H01Q 15/14* (2013.01); *H04B 5/263* (2024.01)

(58) Field of Classification Search
CPC ...... H01Q 1/22; H01Q 1/2208; H01Q 1/2216; H01Q 1/2225; H01Q 1/27; H01Q 1/273; H01Q 1/276; H01Q 15/14; H04B 5/00; H04B 5/20–26; H04B 5/263; H04B 5/266; H04B 5/40; H04B 5/43; H04B 5/45; H04B 5/48; H04B 5/70; H04B 5/79; G06F 3/011; G06F 3/012; G06F 3/013; G02C 7/02; G02C 7/04
See application file for complete search history.

(56) References Cited

U.S. PATENT DOCUMENTS

| | | | | |
|---|---|---|---|---|
| 10,644,543 | B1 * | 5/2020 | Pang ................. | H02J 50/80 |
| 2019/0326781 | A1 * | 10/2019 | Miller ................ | H04B 5/263 |
| 2021/0036549 | A1 * | 2/2021 | Mirjalili ............ | G02C 11/10 |

FOREIGN PATENT DOCUMENTS

TW            201826617 A        7/2018

* cited by examiner

*Primary Examiner* — Robert Karacsony
(74) *Attorney, Agent, or Firm* — Birch, Stewart, Kolasch & Birch, LLP

(57) ABSTRACT

A communication system includes a contact lens element and a wearable device. The contact lens element has a communication function. The wearable device includes a transceiver circuit, a first metal structure, a second metal structure, and a reflector. The transceiver circuit includes a wireless communication circuit and a wireless charge circuit. The first metal structure is coupled to the wireless communication circuit. The first metal structure is configured to communicate with the contact lens element. The second metal structure is coupled to the wireless charge circuit. The second metal structure is configured to provide electric power for the contact lens element. The reflector is adjacent to the first metal structure and the second metal structure, so as to reflect radiation energy from the first metal structure and the second metal structure.

21 Claims, 6 Drawing Sheets

COMMUNICATION SYSTEM AND WEARABLE DEVICE AND COMMUNICATION METHOD THEREOF

CROSS REFERENCE TO RELATED APPLICATIONS

This application claims priority of Taiwan Patent Application No. 112126421 filed on Jul. 14, 2023, the entirety of which is incorporated by reference herein.

BACKGROUND OF THE INVENTION

Field of the Invention

The invention relates to a communication device, and more particularly, to a communication device and a wearable device thereof.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, it is difficult to integrate some wearable devices for specific applications with other types of communication devices, resulting in insufficient compatibility between the various devices. Accordingly, there is a need to propose a novel solution for solving the problems of the prior art.

BRIEF SUMMARY OF THE INVENTION

In an exemplary embodiment, the invention is directed to a communication system that includes a contact lens element and a wearable device. The contact lens element has a communication function. The wearable device includes a transceiver circuit, a first metal structure, a second metal structure, and a reflector. The transceiver circuit includes a wireless communication circuit and a wireless charge circuit. The first metal structure is coupled to the wireless communication circuit. The first metal structure is configured to communicate with the contact lens element. The second metal structure is coupled to the wireless charge circuit. The second metal structure is configured to provide electric power to the contact lens element. The reflector is adjacent to the first metal structure and the second metal structure, so as to reflect radiation energy from the first metal structure and the second metal structure.

In some embodiments, the contact lens element includes a transceiver module, a power supply module, and a display unit. The transceiver module is wirelessly connected to the first metal structure. The power supply module is wirelessly connected to the second metal structure. The display unit is coupled to the transceiver module and the power supply module.

In some embodiments, the wearable device is a head mounted communication device.

In some embodiments, the first metal structure operates in a first frequency band, and the first frequency band is from 10 MHz to 100 MHz.

In some embodiments, the second metal structure operates in a second frequency band, and the second frequency band is from 1 MHz to 15 MHz.

In some embodiments, the first metal structure and the second metal structure are disposed on different planes.

In some embodiments, the reflector is implemented with a ferrite sheet.

In some embodiments, the wearable device further includes a signal processing circuit coupled to the transceiver circuit.

In some embodiments, the wearable device further includes a third metal structure coupled to the wireless communication circuit. The third metal structure is configured to communicate with the contact lens element.

In some embodiments, the wireless communication circuit generates a first RSSI (Received Signal Strength Indication) related to the first metal structure and generates a second RSSI related to the third metal structure. The signal processing circuit performs a tracking process on the contact lens element according to the first RSSI and the second RSSI.

In some embodiments, the wearable device further includes a third metal structure coupled to the wireless charge circuit. The third metal structure is configured to provide the electric power for the contact lens element.

In some embodiments, the wireless charge circuit generates the first power supply efficiency related to the second metal structure and generates the second power supply efficiency related to the third metal structure. The signal processing circuit performs a tracking process on the contact lens element according to the first power supply efficiency and the second power supply efficiency.

In some embodiments, each of the first metal structure, the second metal structure, and the third metal structure includes a coil or one or more electrode pads.

In another exemplary embodiment, the invention is directed to a communication system that includes a contact lens element and a wearable device. The contact lens element has a communication function. The wearable device includes a transceiver circuit, a first metal structure, and a reflector. The transceiver circuit includes a wireless communication circuit. The first metal structure is coupled to the wireless communication circuit. The first metal structure is configured to communicate with the contact lens element. The reflector is disposed adjacent to the first metal structure, so as to reflect radiation energy from the first metal structure.

In an exemplary embodiment, the invention is directed to a wearable device for interacting with a contact lens element. The wearable device includes a transceiver circuit, a first metal structure, a second metal structure, and a reflector. The transceiver circuit includes a wireless communication circuit and a wireless charge circuit. The first metal structure is coupled to the wireless communication circuit. The first metal structure is configured to communicate with the contact lens element. The second metal structure is coupled to the wireless charge circuit. The second metal structure is configured to provide electric power for the contact lens element. The reflector is adjacent to the first metal structure and the second metal structure, so as to reflect radiation energy from the first metal structure and the second metal structure.

In another exemplary embodiment, the invention is directed to a communication method that includes the following steps. A wearable device is provided. The wearable device includes a transceiver circuit, a first metal structure, a second metal structure, and a reflector. The transceiver circuit includes a wireless communication circuit and a wireless charge circuit. The first metal structure is coupled to the wireless communication circuit. The second metal structure is coupled to the wireless charge circuit. The reflector is adjacent to the first metal structure and the second metal structure. The first metal structure communicates with the contact lens element. The second metal structure provides electric power to the contact lens element. The reflector reflects radiation energy from the first metal structure and the second metal structure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
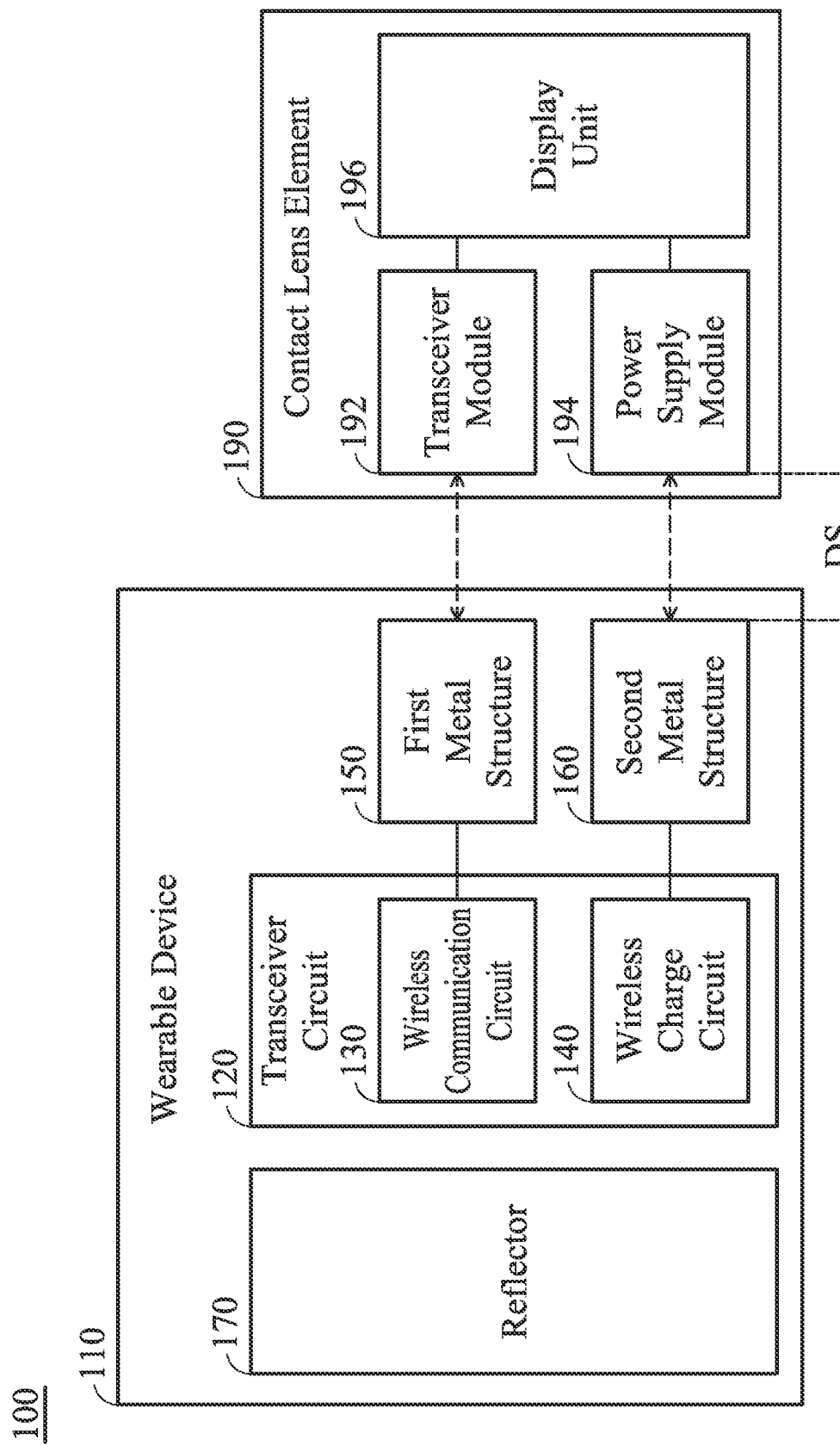
FIG. 1 is a diagram of a communication system according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication system 100 according to an embodiment of the invention. In the embodiment of FIG. 1, the communication system 100 includes a wearable device 110 and a contact lens element 190. For example, the wearable device 110 may be a head mounted communication device, and the contact lens element 190 may be an SCL (Smart Contact lens) with the function of communication, but they are not limited thereto. Specifically, the wearable device 110 includes a transceiver circuit 120, a first metal structure 150, a second metal structure 160, and a reflector 170. It should be understood that the wearable device 110 may further include other components, such as a housing, a nonconductive carrier element, a speaker, and/or a processor, although they are not displayed in FIG. 1.

The transceiver circuit 120 includes a wireless communication circuit 130 and a wireless charge circuit 140. For example, the wireless communication circuit 130 may include a signal source and a signal processor (not shown), and the wireless charge circuit 140 may be coupled to a battery module or an external AC (Alternating Current) power source (not shown), but they are not limited thereto.

The first metal structure 150 may include a coil. The first metal structure 150 is coupled to the wireless communication circuit 130. The first metal structure 150 is configured to communicate with the contact lens element 190. In some embodiments, the first metal structure 150 is also coupled to a first matching circuit (not shown), so as to adjust the corresponding impedance matching. For example, the first metal structure 150 may operate in a first frequency band, and the first frequency band may be from 10 MHz to 100 MHz. However, the invention is not limited thereto. In alternative embodiments, the wearable device 110 includes a plurality of first metal structures 150, which are all coupled to the wireless communication circuit 130.

In other embodiments, the first metal structure 150 includes one or more electrode pads for HBC (Human Body Communication). In an HBC system, the electrode pads are usually designed as metal surfaces in contact with the skin, so as to effectively transmit and receive communication signals with the human body as the medium. In some embodiments, the electrode pads of the first metal structure 150 are used to transmit an HBC signal through a human head portion to an HBC transceiver module on an SCL. The aforementioned electrode pads may be implemented by materials with good electrical conductivity and biocompatibility, such as metal materials (e.g., copper or silver), carbon materials, or biocompatible coats, etc. The specific structure of the electrode pads may be different for various applications, including different shapes, different sizes, and different arrangements.

The second metal structure 160 is coupled to the wireless charge circuit 140. The second metal structure 160 is configured to provide electric power for the contact lens element 190. Similarly, the second metal structure 160 may include a coil or one or more electrode pads. In some embodiments, the second metal structure 160 is also coupled to a second matching circuit (not shown), so as to adjust the corresponding impedance matching. For example, the second metal structure 160 may operate in a second frequency band, and the second frequency band may be from 1 MHz to 15 MHz. Furthermore, there may be an overlapping frequency band between the first frequency band and the second frequency band, and the overlapping frequency band may be from 10 MHz to 15 MHz for enhancing the partial performance of the first frequency band. However, the invention is not limited thereto. In alternative embodiments, the wearable device 110 includes a plurality of second metal structures 160, which are all coupled to the wireless charge circuit 140.

For example, the reflector 170 may be implemented with a ferrite sheet. The reflector 170 is disposed adjacent to the first metal structure 150 and the second metal structure 160, so as to reflect the radiation energy from the first metal structure 150 and the second metal structure 160. Accordingly, the overall transmission efficiency of the wearable device 110 can be significantly improved. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

In some embodiments, the contact lens element 190 includes a transceiver module 192, a power supply module 194, and a display unit 196, but it is not limited thereto. The transceiver module 192 is wirelessly connected to the first metal structure 150 of the wearable device 110, so as to receive the data from the wireless communication circuit 130 of the wearable device 110. The power supply module 194 is wirelessly connected to the second metal structure 160 of the wearable device 110. For example, the power supply module 194 may include another coil (not shown), so as to receive the electric power from the wireless charge circuit 140 of the wearable device 110. Also, the display unit 196 is respectively coupled to the transceiver module 192 and the power supply module 194. The display unit 196 can be supplied by the power supply module 194. The display unit 196 can display a corresponding image according to the received data of the transceiver module 192.

With the design of the invention, the wearable device 110 of the communication system 100 can perform a communication process and a charge process on the contact lens element 190 at the same time. It should be understood that the contact lens element 190 should rely on stable power to provide the function of good communication. Therefore, the proposed wearable device 110 can ensure its power supply to effectively improve the overall communication quality of the communication system 100.

In some embodiments, if the specific distance DS between the first metal structure 150 or the second metal structure 160 and the contact lens element 190 is set from 5 cm to 30 cm, the overall communication quality of the communication system 100 can be further enhanced. In alternative embodiments, the proposed wearable device 110 can be independently used, and it is not necessary to combine the wearable device 110 with the contact lens element 190. In other simplified embodiments, the wearable device 110 does not include the second metal structure 160, and the transceiver circuit 120 does not include the wireless charge circuit 140, but they are not limited thereto.

The following embodiments will introduce different configurations and detail structural features of the communication system 100. It should be understood that these figures and descriptions are merely exemplary, rather than limitations of the invention.

Figure 2A:
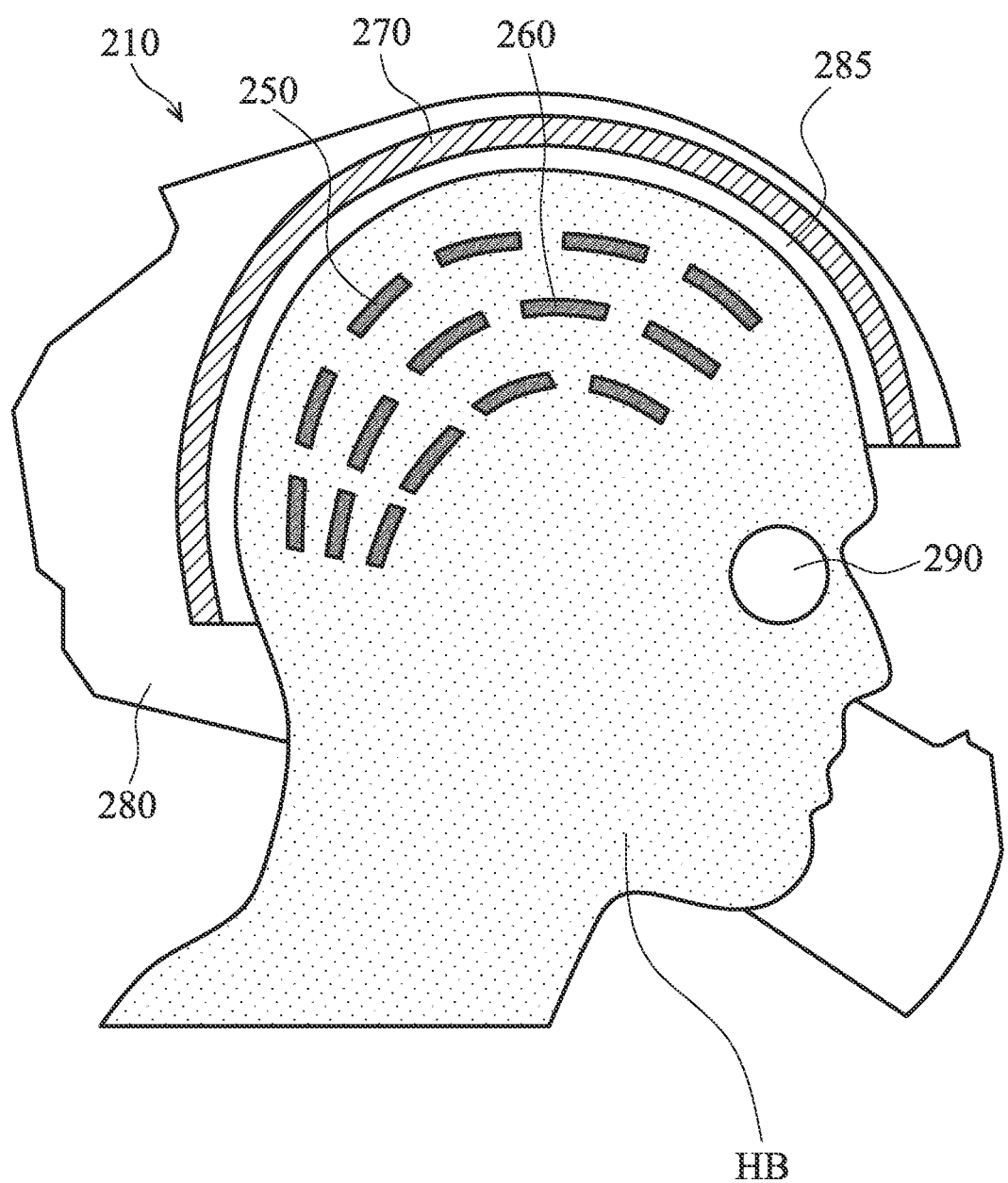
FIG. 2A is a sectional view of a communication system according to an embodiment of the invention.
Figure 2B:
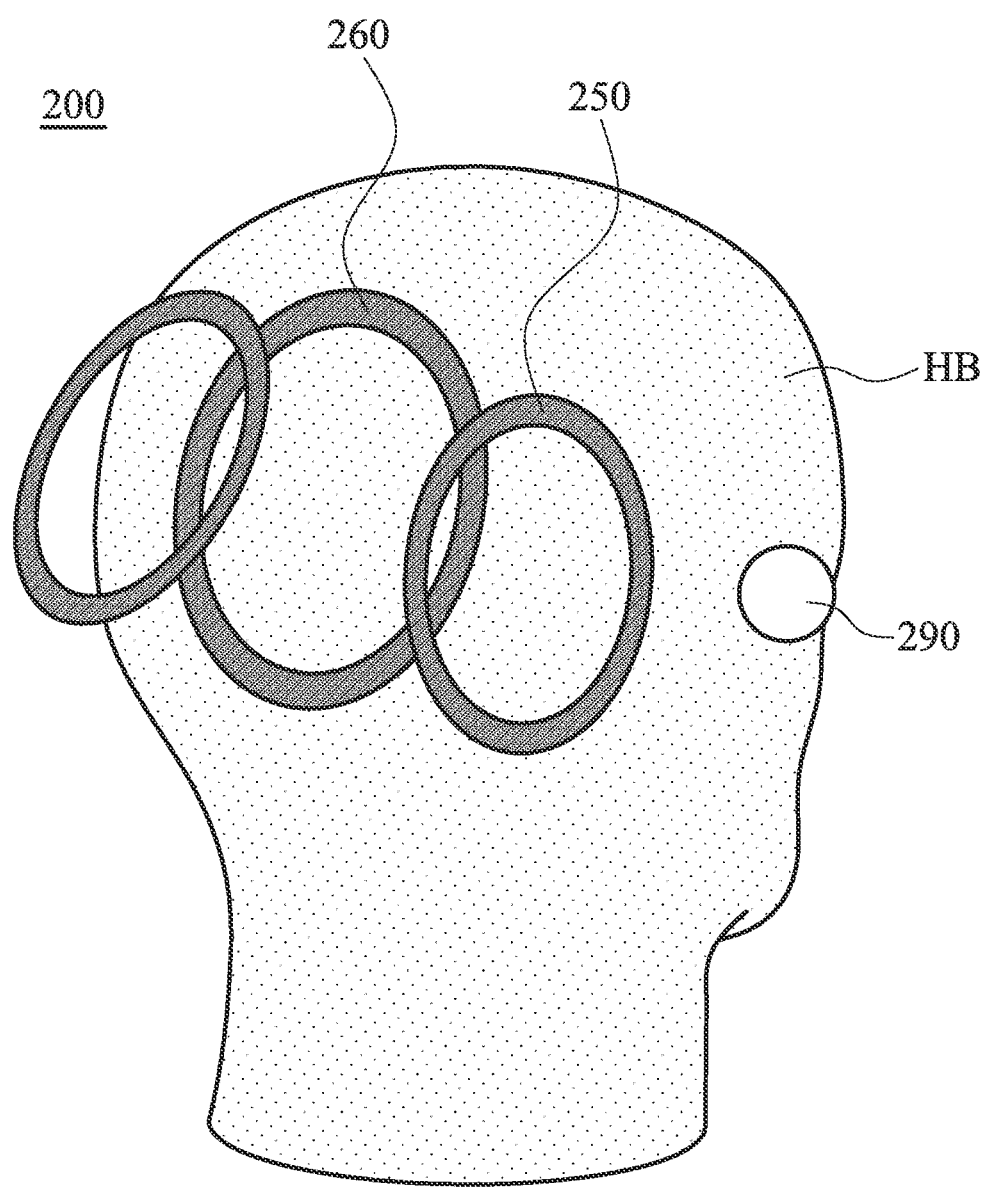
FIG. 2B is a partial perspective view of a communication system according to an embodiment of the invention.

FIG. 2A is a sectional view of a communication system 200 according to an embodiment of the invention. FIG. 2B is a partial perspective view of the communication system 200 according to an embodiment of the invention. Please refer to FIG. 2A and FIG. 2B together. FIG. 2A and FIG. 2B are similar to FIG. 1. In the embodiment of FIG. 2A and FIG. 2B, the communication device 200 includes a wearable device 210 and a contact lens element 290. The wearable device 210 includes a first metal structure 250, a second metal structure 260, a reflector 270, and a helmet body 280. It should be understood that in order to simplify the figures, the aforementioned transceiver circuit is not displayed in FIG. 2A and FIG. 2B. For example, the helmet body 280 may be made of a nonconductive material, and it may be classified as a full-face helmet or a semi-cover type helmet. The reflector 270 may substantially have a C-shape, which may be attached to the inner side of the helmet body 280. There may be a gap 285 between the reflector 270 or the helmet body 280 and a user head portion HB. Furthermore, the first metal structure 250 and the second metal structure 260 may be attached to the other portions of the helmet body 280. As shown in FIG. 2B, the first metal structure 250 and the second metal structure 260 may be disposed on different planes. According to practical measurements, such a nonplanar design can help to reduce the interference between the first metal structure 250 and the second metal structure 260. Generally, the wearable device 210 can communicate with the contact lens element 290 through the user head portion HB, and can also provide electric power for the contact lens element 290, such that the wearable device 210 can be well integrated with the contact lens element 290. Other features of the communication device 200 of FIG. 2A and FIG. 2B are similar to those of the communication device 100 of FIG. 1. Therefore, the two embodiments can achieve similar levels of performance.

Figure 3:
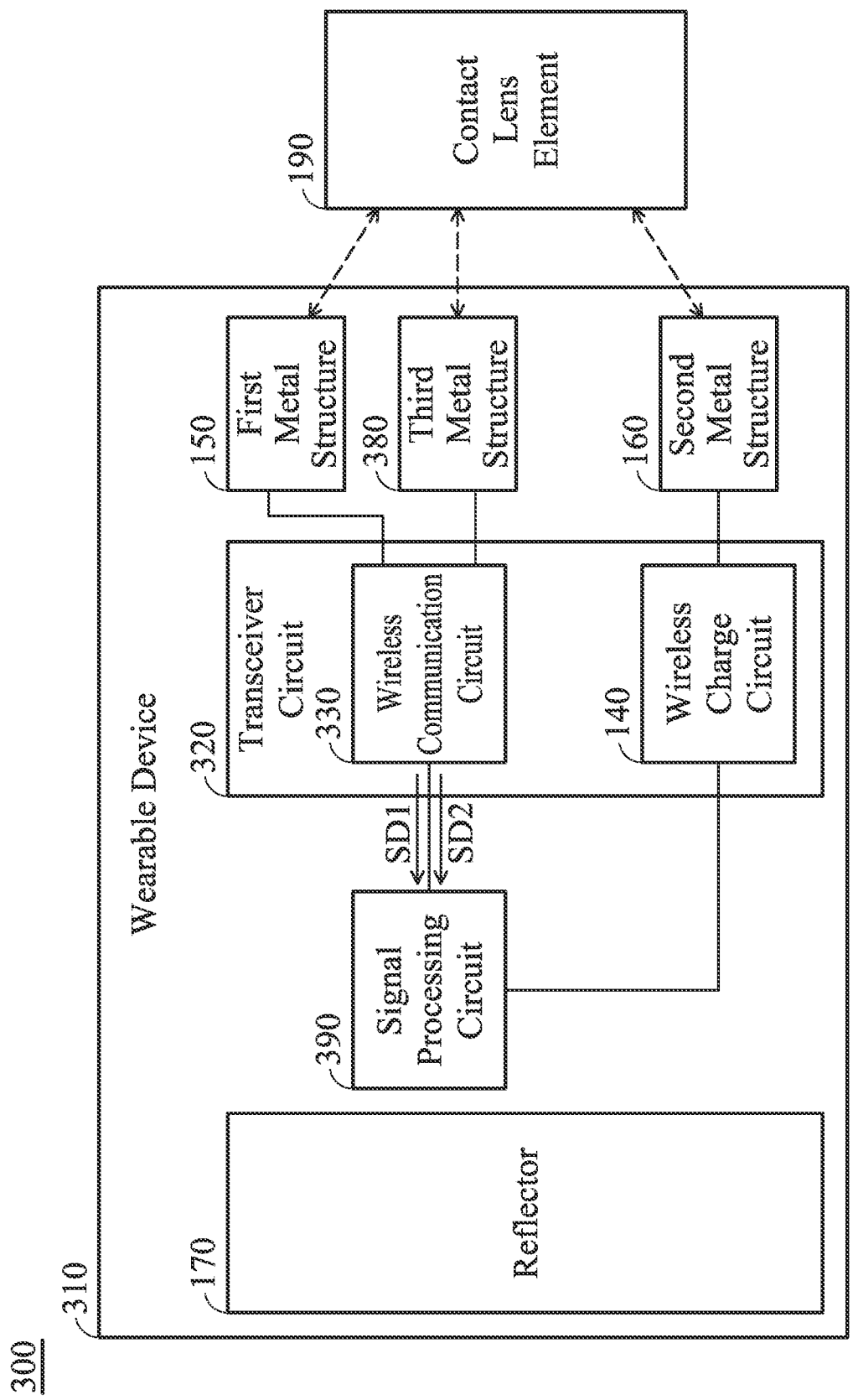
FIG. 3 is a diagram of a communication system according to an embodiment of the invention.

FIG. 3 is a diagram of a communication system 300 according to an embodiment of the invention. FIG. 3 is similar to FIG. 1. In the embodiment of FIG. 3, a wearable device 310 of the communication system 300 further includes a third metal structure 380 and a signal processing circuit 390. Similarly, the third metal structure 380 may include a coil or one or more electrode pads. Both the first metal structure 150 and the third metal structure 380 are coupled to a wireless communication circuit 330 of a transceiver circuit 320 of the wearable device 310. Both the first metal structure 150 and the third metal structure 380 are configured to communicate with the contact lens element 190. As mentioned above, the first metal structure 150, the second metal structure 160, and the third metal structure 380 may be disposed on different planes. In addition, the signal processing circuit 390 is respectively coupled to the wireless communication circuit 330 and the wireless charge circuit 140 of the transceiver circuit 320. Specifically, the wireless communication circuit 330 can generate a first RSSI (Received Signal Strength Indication) SD1 related to the first metal structure 150 and generate a second RSSI SD2 related to the third metal structure 380. Then, the signal processing circuit 390 can perform a tracking process on the contact lens element 190 according to the first RSSI SD1 and the second RSSI SD2. The relative information of each RSSI may be transmitted between circuits in the form of a voltage signal or a current signal. Because the contact lens element 190 is usually disposed on an eyeball of a user, the aforementioned tracking process can also have an eye-tracking function. In alternative embodiments, if the wireless communication circuit 330 is coupled to more metal structures, the accuracy of the aforementioned tracking process will be further increased. In some embodiments, the signal processing circuit 390 can selectively use any one of the first metal structure 150 and the third metal structure 380 according to the first RSSI SD1 and the second RSSI SD2. For example, if the second RSSI SD2 is greater than the first RSSI SD1, the wireless communication circuit 330 may merely use the third metal structure 380 to communicate with the contact lens element 190, and the first metal structure 150 may be disabled and the third metal structure 380 may be enabled. Other features of the communication device 300 of FIG. 3 are similar to those of the communication device 100 of FIG. 1. Therefore, the two embodiments can achieve similar levels of performance.

Figure 4:
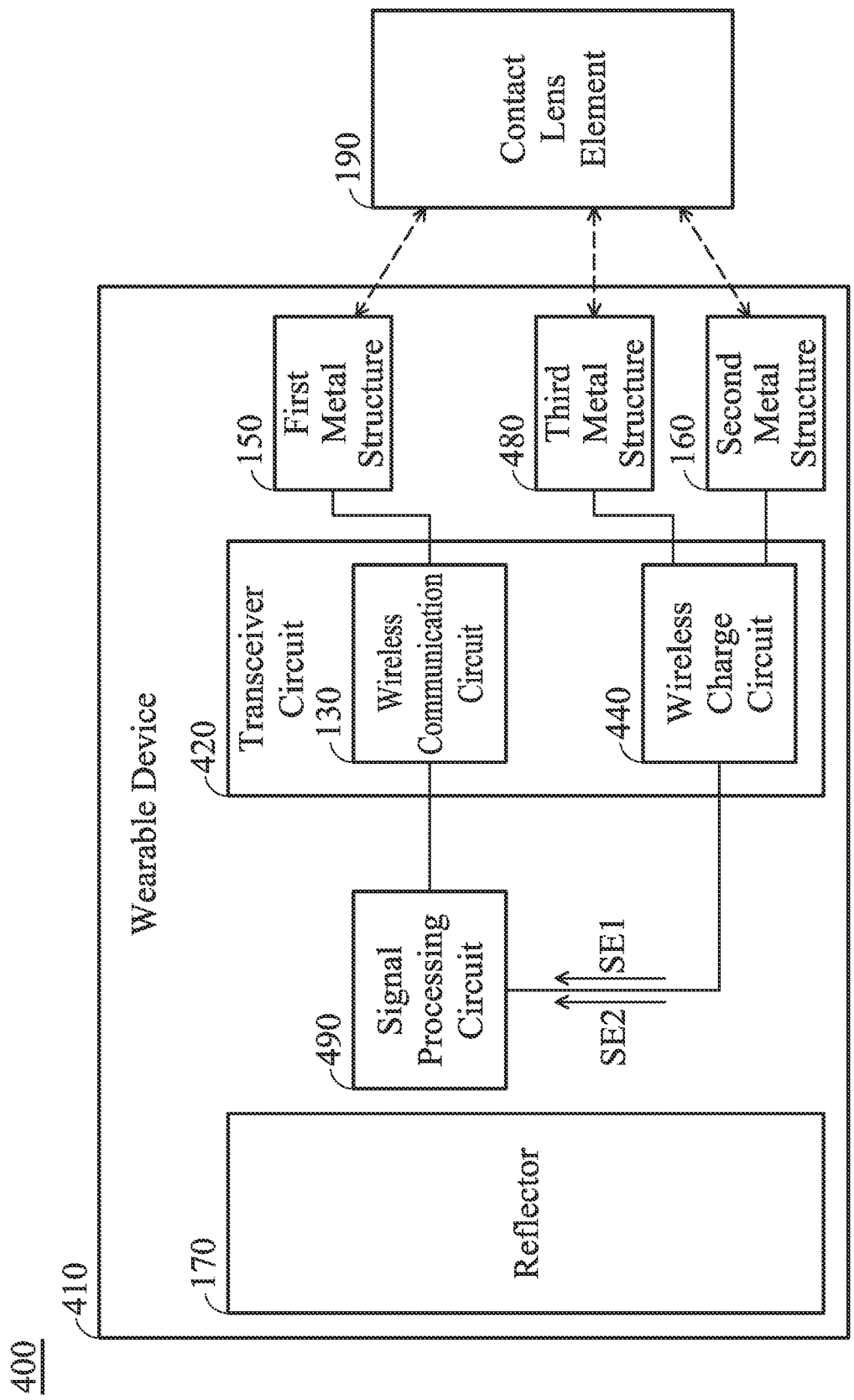
FIG. 4 is a diagram of a communication system according to an embodiment of the invention.

FIG. 4 is a diagram of a communication system 400 according to an embodiment of the invention. FIG. 4 is similar to FIG. 1. In the embodiment of FIG. 4, a wearable device 410 of the communication system 400 further includes a third metal structure 480 and a signal processing circuit 490. Both the second metal structure 160 and the third metal structure 480 are coupled to a wireless charge circuit 440 of a transceiver circuit 420 of the wearable device 410. Both the second metal structure 160 and the third metal structure 480 are configured to provide electric power for the contact lens element 190. In addition, the signal processing circuit 490 is respectively coupled to the wireless communication circuit 130 and the wireless charge circuit 440 of the transceiver circuit 420. Specifically, the wireless charge circuit 440 can generate first power supply efficiency SE1 related to the second metal structure 160 and generate second power supply efficiency SE2 related to the third metal structure 480. Then, the signal processing circuit 490 can perform a tracking process on the contact lens element 190 according to the first power supply efficiency SE1 and the second power supply efficiency SE2. The relative information of each power supply efficiency may be transmitted between circuits in the form of a voltage signal or a current signal. In alternative embodiments, if the wireless charge circuit 440 is coupled to more metal structures, the accuracy of the aforementioned tracking process will be further increased. In some embodiments, the signal processing circuit 490 can selectively use any one of the second metal structure 160 and the third metal structure 480 according to the first power supply efficiency SE1 and the second power supply efficiency SE2. For example, if the first power supply efficiency SE1 is greater than the second power supply efficiency SE2, the wireless charge circuit 440 may merely use the second metal structure 160 to provide electric power for the contact lens element 190, and the second metal structure 160 may be enabled and the third metal structure 480 may be disabled. Other features of the communication device 400 of FIG. 4 are similar to those of the communication device 100 of FIG. 1. Therefore, the two embodiments can achieve similar levels of performance.

Figure 5:
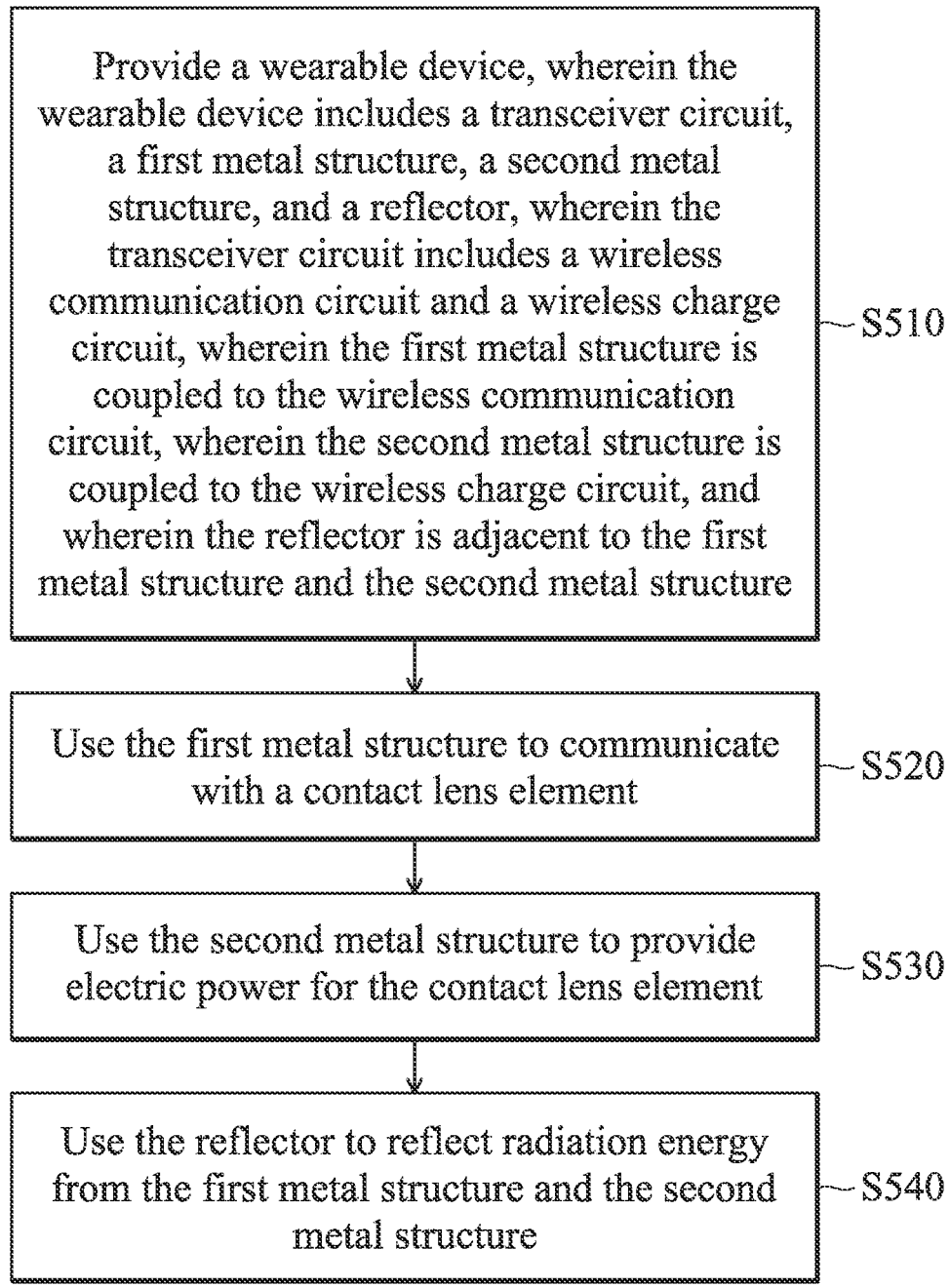
FIG. 5 is a flowchart of a communication method according to an embodiment of the invention.

FIG. 5 is a flowchart of a communication method according to an embodiment of the invention. To begin, in step S510, a wearable device is provided. The wearable device includes a transceiver circuit, a first metal structure, a second metal structure, and a reflector. The transceiver circuit includes a wireless communication circuit and a wireless charge circuit. The first metal structure is coupled to the wireless communication circuit. The second metal structure is coupled to the wireless charge circuit. The reflector is adjacent to the first metal structure and the second metal structure. In step S520, the first metal structure is used to communicate with a contact lens element. In step S530, the second metal structure is used to provide electric power for the contact lens element. Finally, in step S540, the reflector is used to reflect radiation energy from the first metal structure and the second metal structure. It should be understood that these steps are not required to be performed in order, and every feature of the embodiments of FIGS. 1 to 4 may be applied to the communication method of FIG. 5.

The invention proposes a novel communication system, a novel wearable device, and a novel communication method thereof. In comparison to the conventional design, the invention has at least the advantages of increasing the overall communication quality and improving the compatibility between devices. Therefore, the invention is suitable for application in a variety of devices.

It should be noted that the above element parameters are not limitations of the invention. A designer can fine-tune these setting values according to different requirements. The communication system, the wearable device, and the communication method of the invention are not limited to the configurations of FIGS. 1-5. The invention may include any one or more features of any one or more embodiments of FIGS. 1-5. In other words, not all of the features displayed in the figures should be implemented in the communication system, the wearable device, and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication system, comprising:
    a contact lens element, having a function of communication; and
    a wearable device, wherein the wearable device is a head mounted communication device, comprising:
        a transceiver circuit, comprising a wireless communication circuit and a wireless charge circuit;
        a first metal structure, coupled to the wireless communication circuit, wherein the first metal structure is configured to communicate with the contact lens element;
        a second metal structure, coupled to the wireless charge circuit, wherein the second metal structure is configured to provide electric power for the contact lens element; and
        a reflector, disposed adjacent to the first metal structure and the second metal structure, so as to reflect radiation energy from the first metal structure and the second metal structure.

2. The communication system as claimed in claim 1, wherein the contact lens element comprises:
    a transceiver module, wirelessly connected to the first metal structure;
    a power supply module, wirelessly connected to the second metal structure; and
    a display unit, coupled to the transceiver module and the power supply module.

3. The communication system as claimed in claim 1, wherein the first metal structure operates in a first frequency band, and the first frequency band is from 10 MHz to 100 MHz.

4. The communication system as claimed in claim 1, wherein the second metal structure operates in a second frequency band, and the second frequency band is from 1 MHz to 15 MHz.

5. The communication system as claimed in claim 1, wherein the first metal structure and the second metal structure are disposed on different planes.

6. The communication system as claimed in claim 1, wherein the reflector is implemented with a ferrite sheet.

7. The communication system as claimed in claim 1, wherein the wearable device further comprises:
    a signal processing circuit, coupled to the transceiver circuit.

8. The communication system as claimed in claim 7, wherein the wearable device further comprises:
    a third metal structure, coupled to the wireless communication circuit, wherein the third metal structure is configured to communicate with the contact lens element.

9. The communication system as claimed in claim 8, wherein the wireless communication circuit generates a first RSSI (Received Signal Strength Indication) related to the first metal structure and generates a second RSSI related to the third metal structure, and the signal processing circuit performs a tracking process on the contact lens element according to the first RSSI and the second RSSI.

10. The communication system as claimed in claim 7, wherein the wearable device further comprises:
    a third metal structure, coupled to the wireless charge circuit, wherein the third metal structure is configured to provide the electric power for the contact lens element.

11. The communication system as claimed in claim 10, wherein the wireless charge circuit generates first power supply efficiency related to the second metal structure and generates second power supply efficiency related to the third metal structure, and the signal processing circuit performs a tracking process on the contact lens element according to the first power supply efficiency and the second power supply efficiency.

12. The communication system as claimed in claim 10, wherein each of the first metal structure, the second metal structure, and the third metal structure comprises a coil or one or more electrode pads.

13. A wearable device for interacting with a contact lens element, wherein the wearable device is a head mounted communication device, comprising:
    a transceiver circuit, comprising a wireless communication circuit and a wireless charge circuit;
    a first metal structure, coupled to the wireless communication circuit, wherein the first metal structure is configured to communicate with the contact lens element;
    a second metal structure, coupled to the wireless charge circuit, wherein the second metal structure is configured to provide electric power for the contact lens element; and
    a reflector, disposed adjacent to the first metal structure and the second metal structure, so as to reflect radiation energy from the first metal structure and the second metal structure.

14. The wearable device as claimed in claim 13, wherein the first metal structure and the second metal structure are disposed on different planes.

15. The wearable device as claimed in claim 13, further comprising:
    a signal processing circuit, coupled to the transceiver circuit.

16. The wearable device as claimed in claim 15, further comprising:
    a third metal structure, coupled to the wireless communication circuit, wherein the third metal structure is configured to communicate with the contact lens element.

17. The wearable device as claimed in claim 16, wherein the wireless communication circuit generates a first RSSI related to the first metal structure and generates a second RSSI related to the third metal structure, and the signal processing circuit performs a tracking process on the contact lens element according to the first RSSI and the second RSSI.

18. The wearable device as claimed in claim 15, further comprising:
    a third metal structure, coupled to the wireless charge circuit, wherein the third metal structure is configured to provide the electric power for the contact lens element.

19. The wearable device as claimed in claim 18, wherein the wireless charge circuit generates first power supply efficiency related to the second metal structure and generates second power supply efficiency related to the third metal structure, and the signal processing circuit performs a tracking process on the contact lens element according to the first power supply efficiency and the second power supply efficiency.

20. The wearable device as claimed in claim 18, wherein each of the first metal structure, the second metal structure, and the third metal structure comprises a coil or one or more electrode pads.

21. A communication method, comprising the steps of:
providing a wearable device, wherein the wearable device is a head mounted communication device, wherein the wearable device comprises a transceiver circuit, a first metal structure, a second metal structure, and a reflector, wherein the transceiver circuit comprises a wireless communication circuit and a wireless charge circuit, wherein the first metal structure is coupled to the wireless communication circuit, wherein the second metal structure is coupled to the wireless charge circuit, and wherein the reflector is adjacent to the first metal structure and the second metal structure;
using the first metal structure to communicate with a contact lens element;
using the second metal structure to provide electric power for the contact lens element; and
using the reflector to reflect radiation energy from the first metal structure and the second metal structure.

* * * * *